United States Patent [19]

Krotky et al.

[11] Patent Number: 4,785,772
[45] Date of Patent: Nov. 22, 1988

[54] CRANKSHAFT OF A FERRO-METALLIC MATERIAL FOR RECIPROCATING PISTON INTERNAL COMBUSTION ENGINES

[75] Inventors: Peter Krotky, Simmozheim; Herbert Ampferer, Sachsenheim, both of Fed. Rep. of Germany

[73] Assignee: Dr. Ing. h.c.F. Porsche Aktiengesellschaft, Stuttgart, Fed. Rep. of Germany

[21] Appl. No.: 42,782

[22] Filed: Apr. 27, 1987

[30] Foreign Application Priority Data

Apr. 26, 1986 [DE] Fed. Rep. of Germany ....... 3614227

[51] Int. Cl.$^4$ ............................................. F02B 75/06
[52] U.S. Cl. .................................... 123/192 B; 74/603
[58] Field of Search ........ 123/192 R, 192 B, 197 AC; 29/6; 74/603, 595, 596

[56] References Cited

U.S. PATENT DOCUMENTS

| | | | |
|---|---|---|---|
| 1,534,411 | 4/1925 | Potter | 74/603 |
| 1,705,165 | 3/1929 | Twyman et al. | 74/603 |
| 2,419,274 | 4/1947 | McDowall et al. | 74/603 |
| 2,815,682 | 12/1957 | Kolbe et al. | 74/603 |

FOREIGN PATENT DOCUMENTS

| | | |
|---|---|---|
| 0485336 | 10/1929 | Fed. Rep. of Germany . |
| 0487753 | 11/1929 | Fed. Rep. of Germany . |
| 23474 | 12/1955 | Fed. Rep. of Germany . |
| 2018273 | 11/1970 | Fed. Rep. of Germany . |
| 0340964 | 7/1904 | France . |
| 0936262 | 7/1948 | France . |

*Primary Examiner*—Willis R. Wolfe
*Assistant Examiner*—M. Macy
*Attorney, Agent, or Firm*—Barnes & Thornburg

[57] ABSTRACT

A crankshaft of a ferro-metallic material for reciprocating engines, particularly for internal combustion engines, includes bearing pins and crank pins whereby the crank pins are delimited by webs extending transversely to a longitudinal center axis of the crankshaft which are constructed as counterweights. For optimizing the crankshaft as regards weight and structural length combined with good mass balancing, the crank pins are provided with hollow bores in the direction of their center axis and the counterweights with heavy-metal bodies.

13 Claims, 3 Drawing Sheets

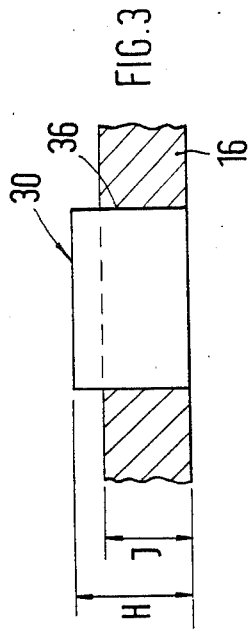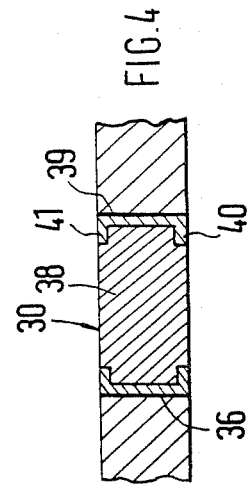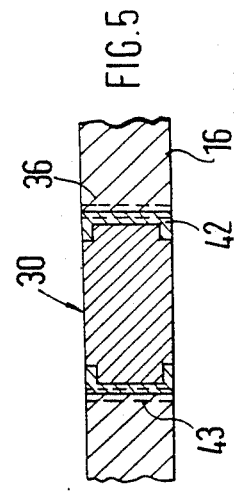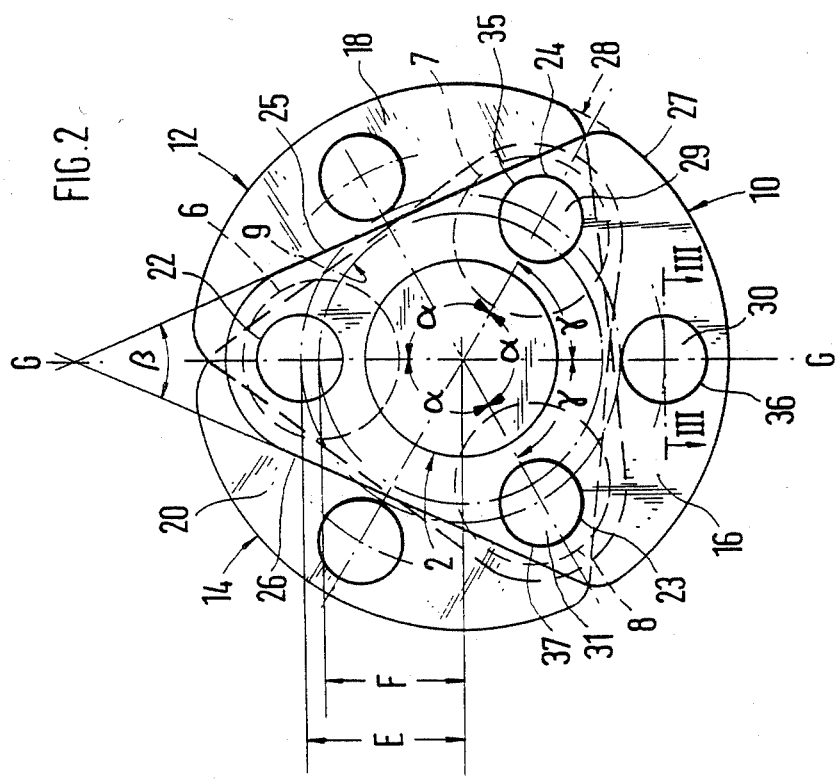

CRANKSHAFT OF A FERRO-METALLIC MATERIAL FOR RECIPROCATING PISTON INTERNAL COMBUSTION ENGINES

BACKGROUND AND SUMMARY OF THE INVENTION

The present invention relates to a crankshaft of a ferro-metallic material for reciprocating piston engines, preferably internal combustion engines with bearing pins extending in a crankshaft longitudinal center axis and with crank pins offset with respect thereto, whereby the crank pins are delimited by webs extending transversely to the crankshaft longitudinal center axis.

The requirement is made of modern internal combustion engines of the reciprocating piston type construction for passenger motor vehicles, for two-wheeled vehicles or the like, that they be optimized as regards weight and structural space. With a given number of the cylinders and a fixed cylinder diameter, this can be influenced by the cylinder spacings and the crankshaft design.

It is the object of the present invention to provide a crankshaft made from a ferro-metallic material whose weight and structural length is relatively small combined with good mass balancing.

The underlying problems are solved according to the present invention in that the crank pins are provided with relief bores extending in the direction of their center axes, preferably with hollow bores, and in that the counterweights are provided with heavy metal bodies.

The principal advantages achieved with the present invention reside in that the crankshaft is optimized as regards weight and structural length by the bores in the crank pins and the heavy metal bodies in the counterweights. The webs and counterweights can be kept narrow by the heavy metal bodies and the length of the counterweights can be reduced as viewed from the crankshaft longitudinal axis. A particularly favorable construction is contemplated in which the hollow bores extend eccentrically to the crank pins and in which each counterweight includes several heavy metal bodies. The heavy metal bodies with cylindrical shape can be inserted in a simple manner into bores of the counterweights and can be secured thereat.

It is contemplated that the heavy metal bodies are formed by a mass part and a steel jacket surrounding the same and are retained form-lockingly and/or force-lockingly in the bores of the counterweights, which provides a simple assembly and safe retention of the heavy metal bodies.

These and other objects, features and advantages of the present invention will become more apparent from the following description when taken in connection with the accompanying drawing which shows, for purposes of illustration only, several embodiments in accordance with the present invention.

BRIEF DESCRIPTION OF THE DRAWINGS

FIG. 2 is a side elevational view of the crankshaft of FIG. 1;

FIG. 3 is a cross-sectional view, taken along line III—III of FIG. 2, on an enlarged scale;

FIG. 4 is a cross-sectional view, similar to FIG. 3, of a modified embodiment in accordance with the present invention;

FIG. 5 is a cross-sectional view, similar to FIG. 3, of a still further modified embodiment in accordance with the present invention:

DETAILED DESCRIPTION OF THE DRAWINGS

Figure 1:
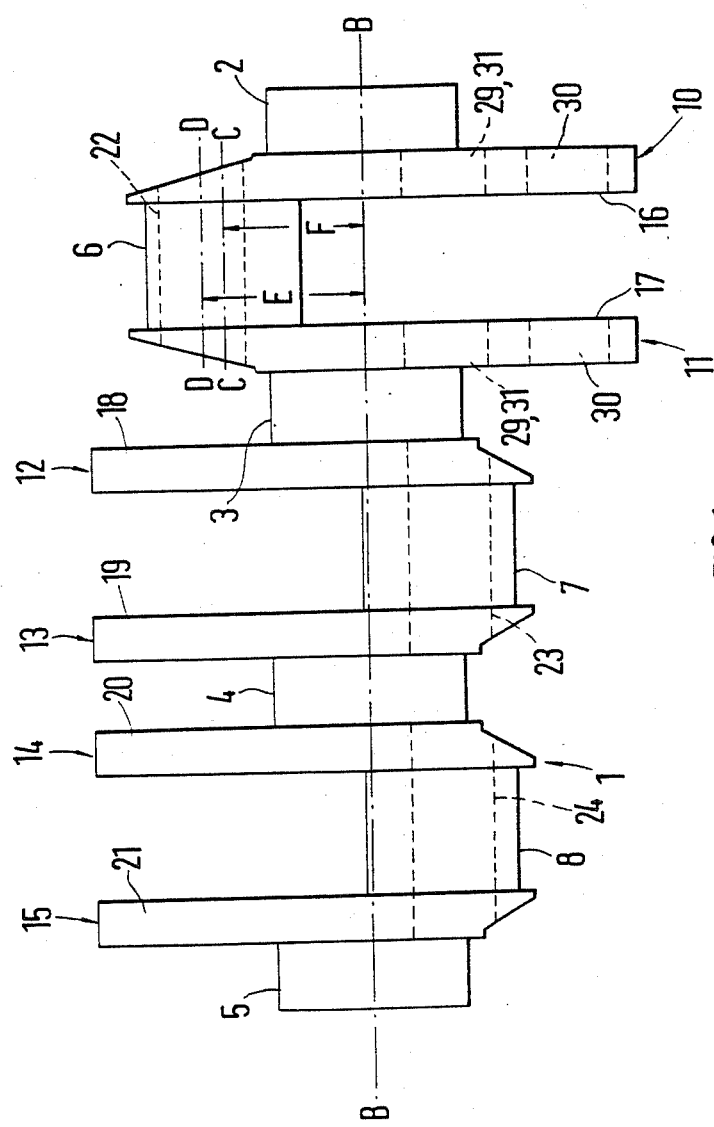
FIG. 1 is a longitudinal elevational view of a crankshaft in accordance with the present invention.

Referring now to the drawings wherein like reference numerals are used throughout the various views to designate like parts, the crankshaft, generally designated by reference numeral 1 which is designed for an internal combustion engine of the reciprocating piston type construction (not shown), includes of a metallic material such as steel or steel casting and includes bearing pins 2, 3, 4, and 5 which extend coaxially to a longitudinal center axis B—B of this crankshaft. Crank pins 6, 7 and 8 are arranged offset with respect to the bearing pins 2, 3, 4, and 5, whereby each crank pin is constructed for receiving two connecting rods (not shown). The crank pins 6, 7 and 8 are uniformly distributed over a theoretical circular circumferential line 9 (FIG. 2) of the crankshaft 1, i.e., are grouped at the angle $\alpha$ of 120°. The thus-constructed crankshaft is intended for a six cylinder internal combustion engine with two rows of cylinders arranged in a V-shape.

Flat plate-like webs 10, 11; 12, 13; 14, 15 extend between the crank pins 6, 7 and 8 and the bearings pins 2, 3, 4 and 5; the webs 10, 11; 12, 13 14, 15 are disposed transversely to the longitudinal center axis B—B of the crankshaft 1. The webs 10 and 11 thereby delimit the crank pin 6, the webs 12 and 13 the crank pin 7 and the webs 14 and 15 the crank pin 8. All webs, which start within the area of the crank pins, are extended beyond the longitudinal center axis B—B and are constructed as counterweights 16, 17; 18, 19; 20, 21. Accordingly, the webs 10 and 11 include the counterweights 16 and 17, the webs 12 and 13 the counterweights 18 and 19 and the webs 14 and 15 the counterweights 20 and 21. The crank pins 6, 7 and 8 are provided with hollow bores 22, 23 and 24 which extend in the direction of the center longitudinal axis C—C of the crank pins but eccentrically to the mentioned center axis in such a manner that the distance E of the center axes D—D of the hollow bores 22, 23, 24 to the longitudinal center axis B—B of the crankshaft 1 is greater than the distance F of the center axes of the crank pins 6, 7, 8 to the center axis B—B.

Figure 6:
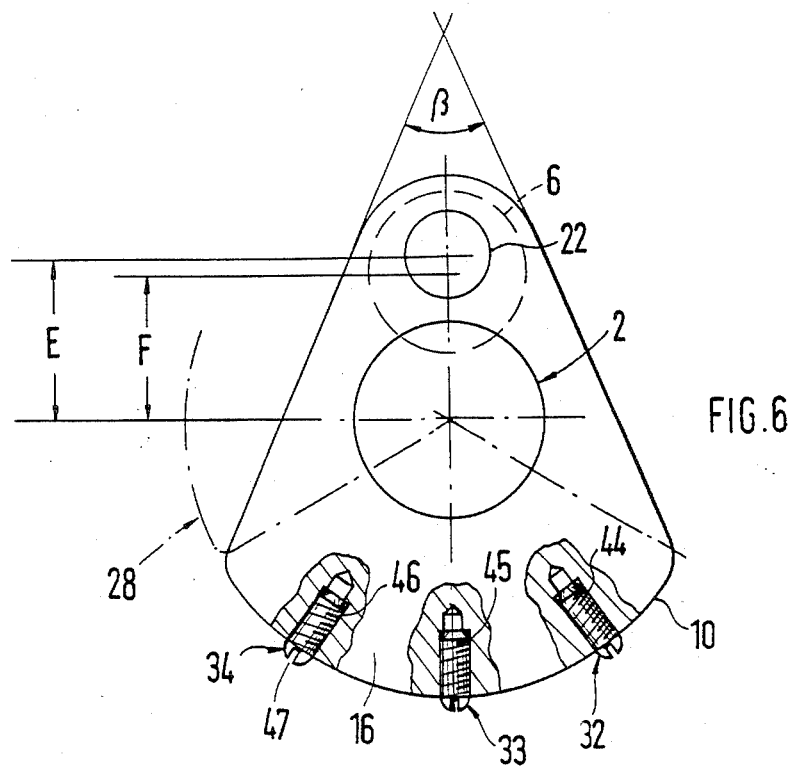
FIG. 6 is a partial elevational view, similar to FIG. 2, of a further embodiment in accordance with the present invention.

Each web, for example, web 10 is delimited—as viewed in side view (FIG. 2)—by the lines 25 and 26 of an acute triangle (angle $\beta$ 40°, in other words, it widens in the direction of the counterweight 16 where its boundary 27 lies on a theoretical circle 28 of the crankshaft 1. Additionally, each counterweight, for example, counterweight 16, is provided with several heavy-metal bodies 29, 30, 31 or 32, 33, 34 (FIGS. 2 and 6) respectively.

The heavy-metal bodies 29, 30, 31 and 32, 33, 34 are made of tungsten, lead or the like which are inserted into apertures of the respective counterweight.

According to FIG. 2, the heavy-metal bodies 29, 30, 31 have a cylindrical shape and are inserted into bores 35, 36, 37 extending parallel to the axis B—B of the crankshaft 1. The bore 36 lies on a plane G—G intersecting the longitudinal center axis B—B whereas the bores 35 and 37 are arranged at the angle $\gamma$ to the plane G—G.

According to FIG. 3, the heavy-metal body 30 of tungsten is pressed into the bore 36 whereby its length H is greater than the thickness J of the counterweight 16. The length H, however, may also be equal to thickness J, and also possibly smaller.

The heavy-metal body 30, however, may also be formed by a mass part 38 of lead and of a cylindrical steel jacket 39 surrounding the part 38 whereby the thus-formed heavy-metal body is retained force-lockingly (equal to press seat) in the bore 36 (FIG. 4). The steel jacket 39 is constructed U-shaped in cross section whereby its legs 40 and 41 surround the mass part 38 in such a manner that no relative movement is possible between the mass part 38 and the steel jacket 39.

In FIG. 5, the heavy-metal body 30 is retained formlockingly in the bore 36. For that purpose, the heavy-metal body 30 includes an external thread 42 which is screwed into a thread 43 of the bore 36.

The heavy-metal bodies 32, 33 and 34 (FIG. 6) are threaded screws which are fixed in radial threaded bores 44, 45, and 46 whereby each of these heavy-metal bodies is provided with a screw head 47.

Figure 7:
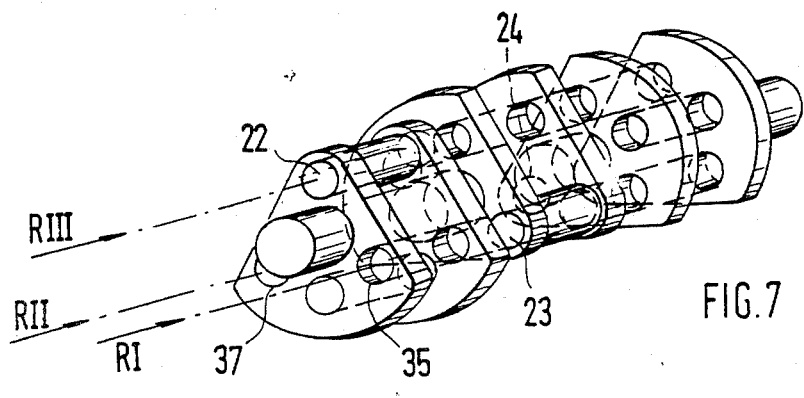
FIG. 7 is a perspective view of a crankshaft in accordance with the present invention.

A part of the bores, namely, bores 35 and 37, for the heavy-metal bodies 29 and 31 and the hollow bores 22, 23 and 24 have common machining directions R I, R II, R III, i.e., one hollow bore and four bores in the counterweights are machined into the counterweights by guiding a boring tool along a machining direction (FIG. 7).

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A crankshaft of ferro-metallic material for reciprocating piston engines, particularly for six cylinder internal combustion engines having two rows of cylinders extending in a V-shape, comprising bearing pin means extending in a crankshaft longitudinal center axis, crank pin means offset with respect to said bearing pin means, web means extending substantially transversely to the crankshaft longitudinal axis for delimiting said crank pin means, said web means being constructed as counterweights, said crank pin means being provided with hollow relief bores extending substantially in the direction of their center axes, said counterweights including counterweight bores having heavy-metal bodies fixed therein, and at least a portion of said counterweight bores and said hollow relief bores of said crank pin means having common machining directions.

2. A crankshaft according to claim 1, wherein the hollow bores extend eccentrically to the crank pin means in such a manner that the distance of the center axes of the hollow bores to the crankshaft longitudinal axis is greater than the distance of the center axes of the crank pin means to the crankshaft longitudinal axis.

3. A crankshaft according to claim 1, wherein each counterweight includes several heavy-metal bodies.

4. A crankshaft according to claim 1, wherein the heavy-metal bodies have a cylindrical shape.

5. A crankshaft according to claim 4, wherein said counterweight bores extend substantially axially to the crankshaft.

6. A crankshaft according to claim 1, wherein the heavy-metal bodies include a mass part which is surrounded by a cylindrical steel jacket, and wherein each heavy-metal body is at least one of force-lockingly and form-lockingly retained in the respective bore.

7. A crankshaft according to claim 6, wherein the mass part consists of lead.

8. A crankshaft according to claim 6, wherein the steel jacket is constructed substantially U-shaped in cross section and surrounds the mass part with its legs.

9. A crankshaft according to claim 4, whose web means widen from the crank pin means and are delimited on the sides disposed remote from the crank pin means, where the counterweights are located, by a circular line, and wherein three heavy-metal bodies are provided per web means.

10. A crankshaft according to claim 4, wherein the heavy-metal bodies are made of tungsten and are pressed into the bores.

11. A crankshaft according to claim 1, wherein a portion of the heavy-metal bodies are constructed in the manner of threaded bolts and are disposed radially to the bearing pin means of the crankshaft.

12. A crankshaft according to claim 3, wherein the heavy-metal bodies have a cylindrical shape.

13. A crankshaft according to claim 1, wherein said heavy-metal bodies are made of tungsten and are pressed into said counterweight bores.

* * * * *